United States Patent [19]
Bray et al.

[11] Patent Number: 5,435,624
[45] Date of Patent: Jul. 25, 1995

[54] POWERED VEHICLE SEAT

[75] Inventors: Martin L. Bray, Rochester Hills; Thomas M. Frusti, Canton; Dee T. Kapur, Ypsilanti, all of Mich.

[73] Assignee: Ford Motor Company, Dearborn, Mich.

[21] Appl. No.: 133,950

[22] Filed: Oct. 12, 1993

[51] Int. Cl.6 .............................................. B60N 2/22
[52] U.S. Cl. ................... 297/362.11; 297/362; 297/378.1
[58] Field of Search ............... 297/362, 362.11, 362.14, 297/378.1, 378.12

[56] References Cited

U.S. PATENT DOCUMENTS

| | | |
|---|---|---|
| 2,660,223 | 11/1953 | Appleton . |
| 2,809,689 | 10/1957 | Garvey et al. . |
| 2,823,949 | 2/1958 | Williams et al. . |
| 2,942,646 | 6/1960 | Himka et al. . |
| 4,304,386 | 12/1981 | Nagashima et al. . |
| 4,685,735 | 8/1987 | McFalls et al. ............ 297/362.14 X |
| 4,832,403 | 5/1989 | Tomita . |
| 4,925,228 | 5/1990 | Pipon et al. . |
| 5,123,703 | 6/1992 | Morris et al. ........................ 297/362 |
| 5,123,706 | 6/1992 | Granzow et al. .......... 297/362.11 X |

FOREIGN PATENT DOCUMENTS

| | | | |
|---|---|---|---|
| 232685 | 8/1987 | European Pat. Off. ........ 297/362.11 |
| 1405868 | 1/1969 | Germany ............................. 297/362 |
| 2931894 | 2/1981 | Germany ............................. 297/362 |
| 2179997 | 3/1987 | United Kingdom ................ 297/362 |

Primary Examiner—Peter R. Brown
Attorney, Agent, or Firm—Daniel M. Stock; Roger L. May

[57] ABSTRACT

A vehicle seat for an occupant of a vehicle includes a generally horizontal seat portion mounted to vehicle structure, a generally upright back portion, a confection mechanism interconnecting the seat portion and the back portion to allow the back portion to rotate relative to the seat portion between a forward dump position and a rearward recline position and a powered mechanism for driving the back portion between the forward dump position and the rearward recline position in response to an occupant input.

19 Claims, 4 Drawing Sheets

POWERED VEHICLE SEAT

BACKGROUND OF THE INVENTION

1. Field of the Invention

The present invention relates generally to seats for vehicles and, more specifically, to a powered seat for an automotive vehicle.

2. Description of the Related Art

It is known to construct seats for occupants of vehicles such as automotive vehicles. Typically, the seats are adjustable forward and backward and for height and tilt. As to tilt, the seats generally include a recliner mechanism to allow a back portion of the seat to tilt forward to a dump position and to tilt rearward to a recline position. Conventionally, the recliner mechanism is manually operated and the back portion moved manually forward to the dump position. Upon reaching the dump position, the back portion engages a pin switch which activates a powered autoglide system to move the seat forward for ingress and egress of the vehicle by an occupant. Although the above seat has worked well, the forward movement of the back portion to the dump position requires manual operation which may be difficult for disabled occupants or when the arms of an occupant are unavailable.

SUMMARY OF THE INVENTION

Accordingly, the present invention is a powered vehicle seat for an occupant of a vehicle including a generally horizontal seat portion mounted to vehicle structure and a generally upright back portion. The vehicle seat also includes connection means interconnecting the seat portion and the back portion to allow the back portion to rotate relative to the seat portion between a forward dump position and a rearward recline position. The vehicle seat further includes powered means for driving the back portion between the forward dump position and the rearward recline position in response to an occupant input.

One feature of the present invention is that a powered seat is provided for an automotive vehicle. Another feature of the present invention is that the powered vehicle seat eliminates manual operation for movement of the back portion between the dump and recline positions. Yet another feature of the present invention is that the powered vehicle seat has a "one touch" motorized design that is activated by a single switch on top of the back portion to power the back portion forward to engage a powered autoglide system and allow easy ingress and egress into the rear seats of the vehicle by an occupant.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
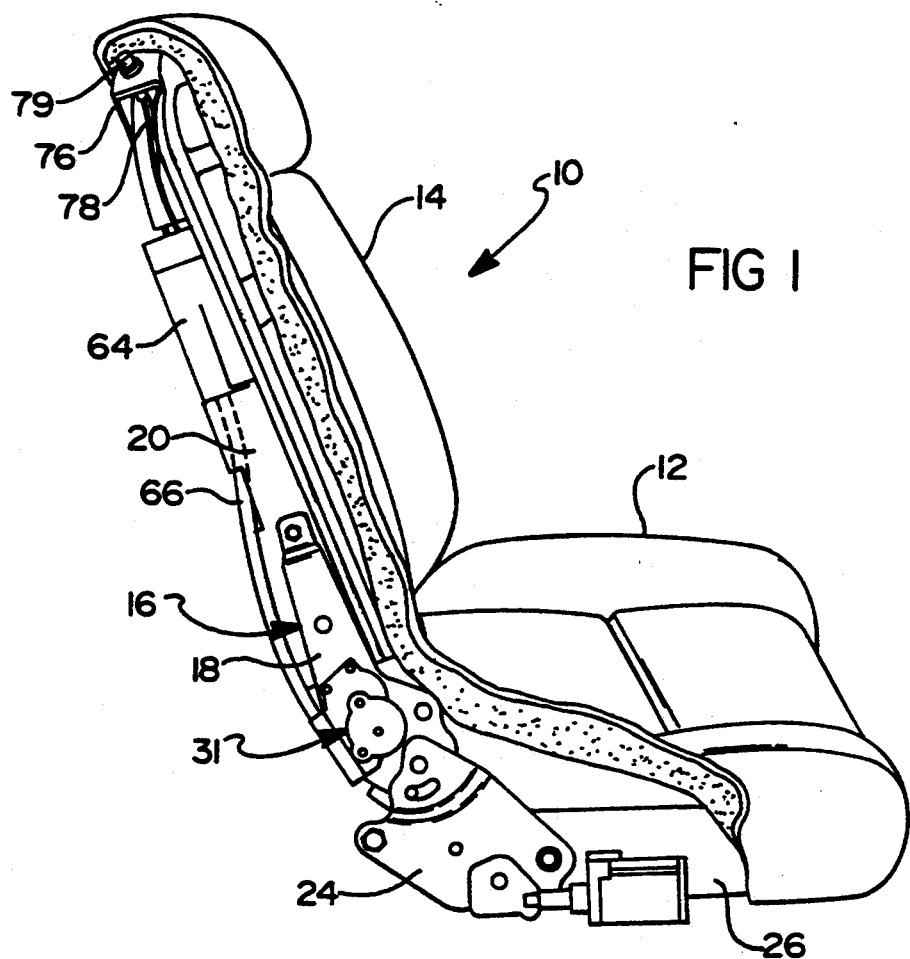
FIG. 1 is a fragmentary elevational view of a powered vehicle seat according to the present invention.
Figure 2:
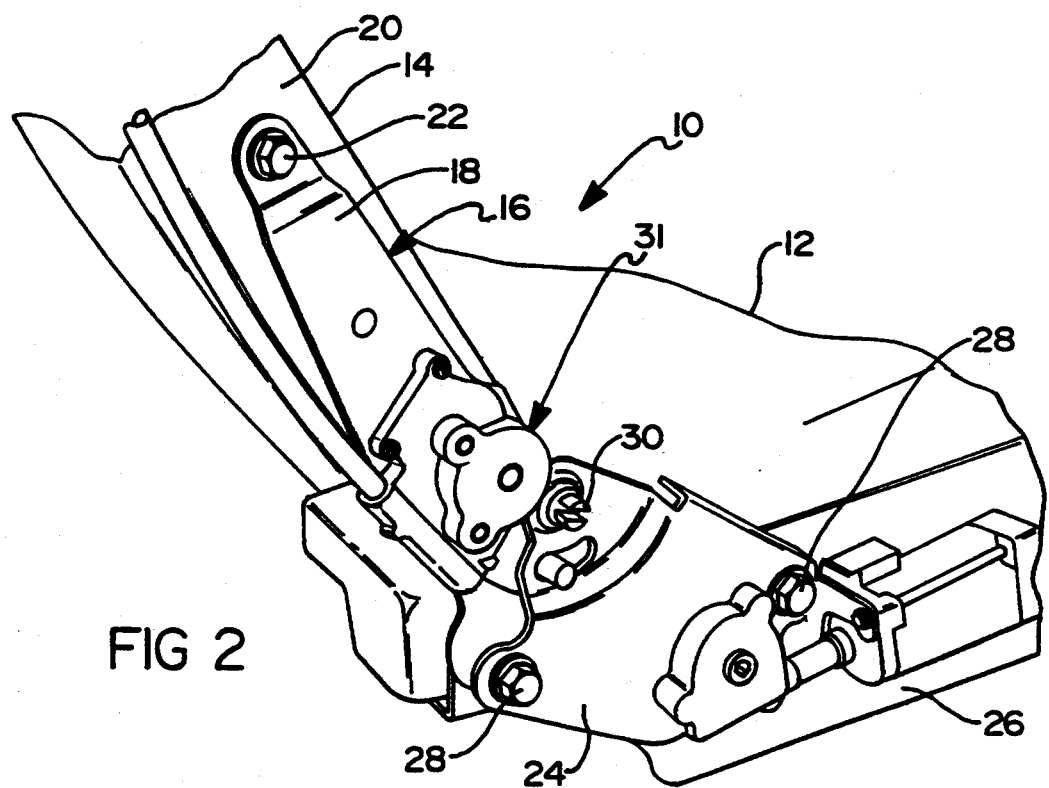
FIG. 2 is a partial enlarged perspective view of a portion of the powered vehicle seat of FIG. 1.

Turning now to the drawings and in particular to FIGS. 1 and 2 thereof, a powered vehicle seat 10, according to the present invention, is shown for a vehicle such as an automotive vehicle (not shown). The powered vehicle seat 10 includes a generally horizontal seat portion 12 and a generally upright back portion 14. The powered vehicle seat 10 may also include a head rest portion (not shown) connected to the back portion 14 in a known manner. The seat portion 12 may be mounted by a pair of laterally spaced tracks (not shown) upon vehicle structure such as a floor pan (not shown). The tracks are powered by an autoglide system (not shown) to power the seat 10 longitudinally both forward and backward to allow easy ingress and egress to rear seats (not shown) of the vehicle. It should be appreciated that the autoglide system is conventional and known in the art.

The powered vehicle seat 10 also includes a recliner or connection mechanism, generally indicated at 16, interconnecting the seat portion 12 and back portion 14. The connection mechanism 16 includes a back member 18 connected to a back frame 20 of the back portion 14 by suitable means such as fasteners 22. The connection mechanism 16 also includes a seat member 24 connected to a seat frame 26 of the seat portion 12 by suitable means such as fasteners 28. The connection mechanism 16 further includes a pin 30 interconnecting the back member 18 and seat member 24 to allow the back member 18 to rotate relative to the seat member 24. It should be appreciated that connection mechanism 16 is disposed on each side of the powered vehicle seat 10.

Figure 3:
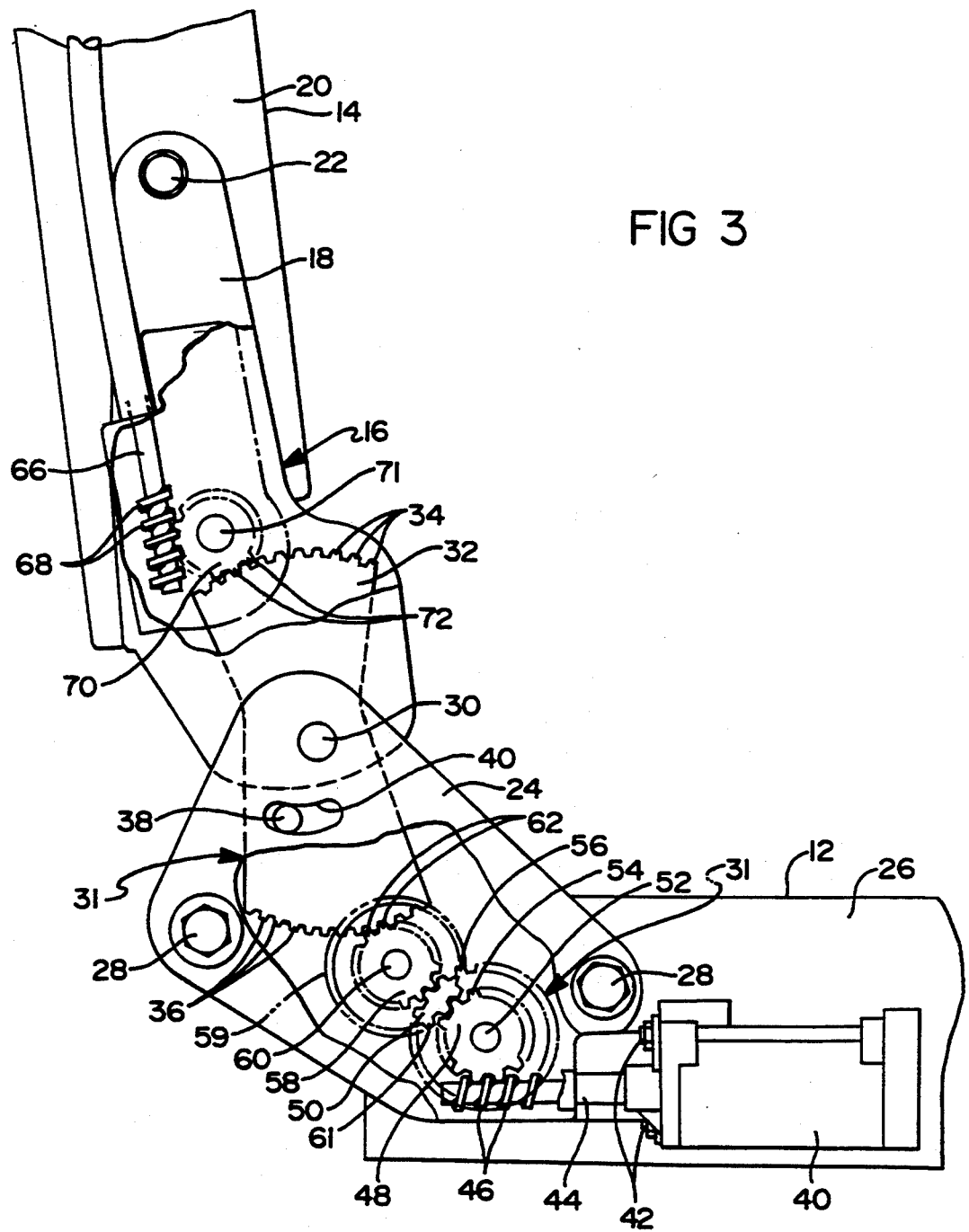
FIG. 3 is an enlarged elevational view of a portion of the powered vehicle seat of FIGS. 1 and 2.

Referring to FIG. 3, the powered vehicle seat 10 further includes a powered mechanism, generally indicated at 31, to drive or rotate the back portion 14 relative to the seat portion 12. The powered mechanism 31 includes a sector member 32 disposed and rotatable about the pin 30. The sector member 32 is an elongated member having a plurality of first teeth 34 at one end and a plurality of second teeth 36 at the other end for a function to be described. The first and second teeth 34 and 36 are spaced circumferentially along their respective arcuate ends. The sector member 32 also has a pin member 38 extending generally perpendicular thereto and disposed between the pin 30 and second teeth 36. The pin member 38 extends through a slot 40 in the seat member 24. The slot 40 is generally arcuate a predetermined distance to control the amount of forward and rearward rotation of the sector member 32 relative to the seat member 24.

The powered mechanism 31 also includes a first or recline motor 40 secured to the seat member 24 by suitable means such as fasteners 42. The recline motor 40 is connected to a switch (not shown) along the seat portion 12 which is, in turn, connected to a source of power (not shown). The powered mechanism 31 includes a Bowden cable 44 connected to the recline motor 40. The cable 44 has a plurality of teeth 46 spaced longitudinally at a free end thereof to form a worm type of gear. The powered mechanism 31 also includes first and second recline gears 48 and 50 disposed about a pin 52 extending through the seat member 24. The first recline gear 48 has a plurality of teeth 54 spaced circumferentially thereabout to engage the teeth 46 of the cable 44. The second recline gear 50 also has a plurality of teeth 56 spaced circumferentially thereabout. The powered mechanism 31 also includes third and fourth recline gears 58 and 59 disposed about a pin 60 extending through the seat member 24. The fourth recline gear 59 has a plurality of teeth 61 spaced circumferentially thereabout to engage the teeth 54 of the first recline gear 48. The third recline gear 58 has a plurality of teeth 62 spaced circumferentially thereabout to engage the teeth 56 of the second recline gear 50 and the second teeth 36 of the sector member 32. It should be appreciated that the gears 48,50,58,59 may be fewer or more to obtain a desired gear ratio between the cable 44 and sector member 32.

Referring to FIGS. 1 through 3, the powered mechanism 31 further includes a second or dump motor 64 secured to the back frame 20 by suitable means such as fasteners (not shown). The powered mechanism 31 includes a Bowden cable 66 connected to the dump motor 64. The cable 66 has a plurality of teeth 68 spaced longitudinally at a free end thereof to form a worm type of gear. The powered mechanism 31 also includes at least one dump gear 70 disposed about a pin 71 extending through the back member 18. The dump gear 70 has a plurality of teeth 72 spaced circumferentially thereabout to engage the teeth 68 of the cable 66 and the first teeth 34 of the sector member 32. It should be appreciated that there may be a plurality of dump gears 70 to obtain a desired gear ratio between the cable 66 and sector member 32.

The powered mechanism 31 further includes a switch 74 connected to the back frame 20 by suitable means such as a bracket 76 and fasteners (not shown). The switch 74 is of the push button type and is connected to the dump motor 64 by electrical wires 78. The switch 74 is also connected to a source of power (not shown). It should be appreciated that the switch 74 extends through the material of the back portion 14 to allow an occupant to activate the switch 74. It should be appreciated that the powered mechanism 31 cooperates with only one of the connection mechanisms 16.

Figure 4:
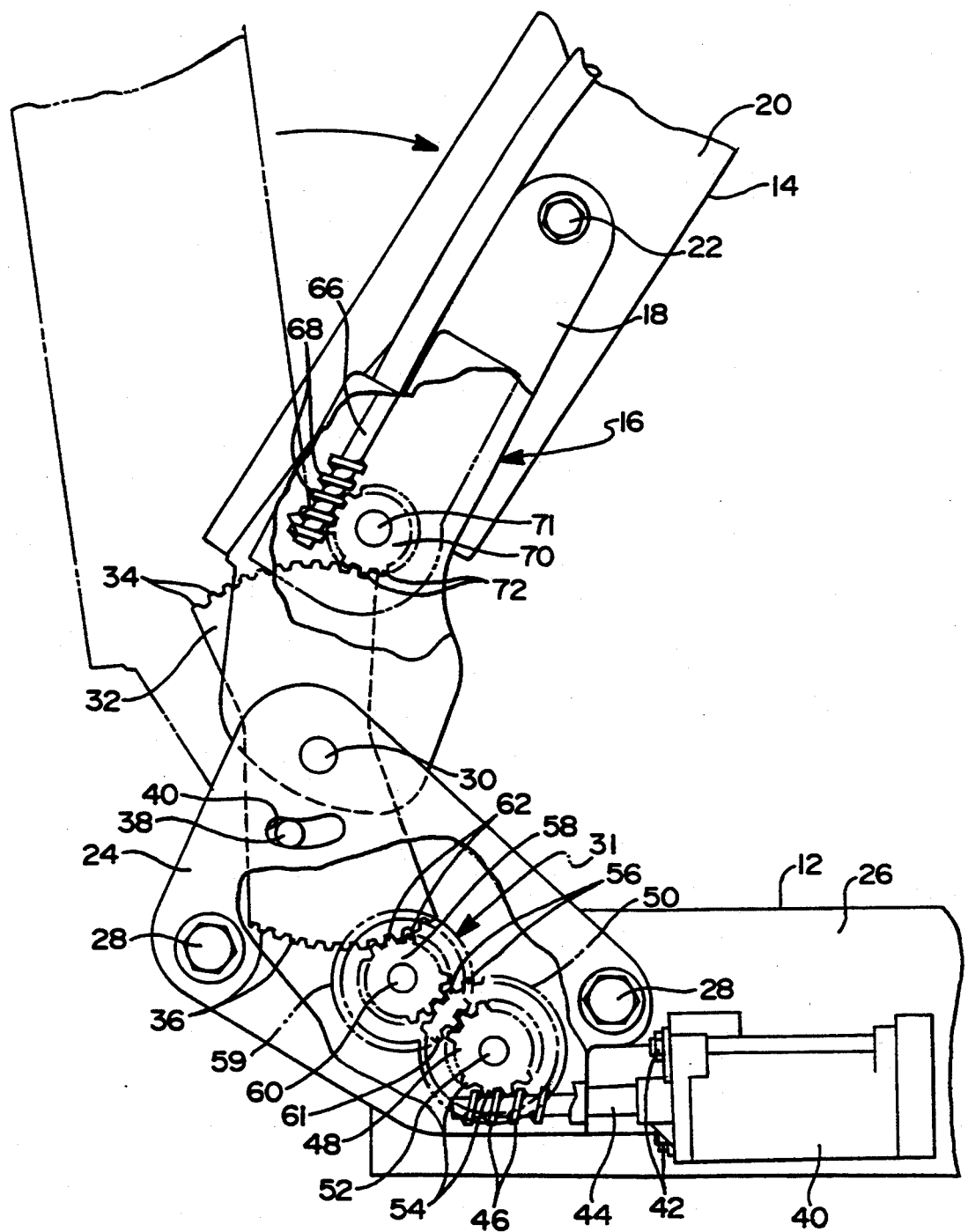
FIG. 4 is a view similar to FIG. 3 illustrating a forward dump position of the powered vehicle seat of FIGS. 1 through 3.

In operation, the back portion 14 is typically in a neutral position as illustrated by the phantom lines in FIG. 4. An occupant activates or pushes on the switch 74 to allow power from the source of power to the dump motor 64. Upon receiving power, the dump motor 64 rotates the cable 66 and teeth 68. Rotation of the teeth 68 rotates the dump gear 70 about the pin 72. Since the sector member 32 remains stationary, the teeth 72 engage the first teeth 34 of the sector member 32 and the dump gear 70 moves longitudinally forward along the sector member 32. As the dump gear 70 moves along the sector member 32, the back member 18 and back portion 14 rotate or move forward relative to the seat member 24 and seat portion 12 to the forward dump position as illustrated by the solid lines in FIG. 4. Upon reaching the dump position, a suitable switch such as a pin or limit switch (not shown) is activated to power the autoglide system (not shown) to move the seat portion 12 longitudinally forward. It should be appreciated that the rotation of the back portion 18 and longitudinal movement of the seat portion 12 could occur simultaneously or independently as described.

Once the occupant enters the rear seats of the vehicle, the occupant activates the switch 74 to power the dump motor 64. The dump motor 64 rotates the cable 66 and teeth 68 in the opposite direction, in turn, rotating the dump gear 70, to move the back member 18 and back portion 14 to the neutral position. Upon reaching the neutral position, a suitable switch such as a pin or limit switch (not shown) is activated to allow power to the autoglide system to move the seat portion 12 longitudinally rearward to its original or neutral position. It should be appreciated that the limit switches and autoglide system are connected to an electronic controller (not shown) to receive inputs from the limit switches and produce outputs to control the autoglide system.

Figure 5:
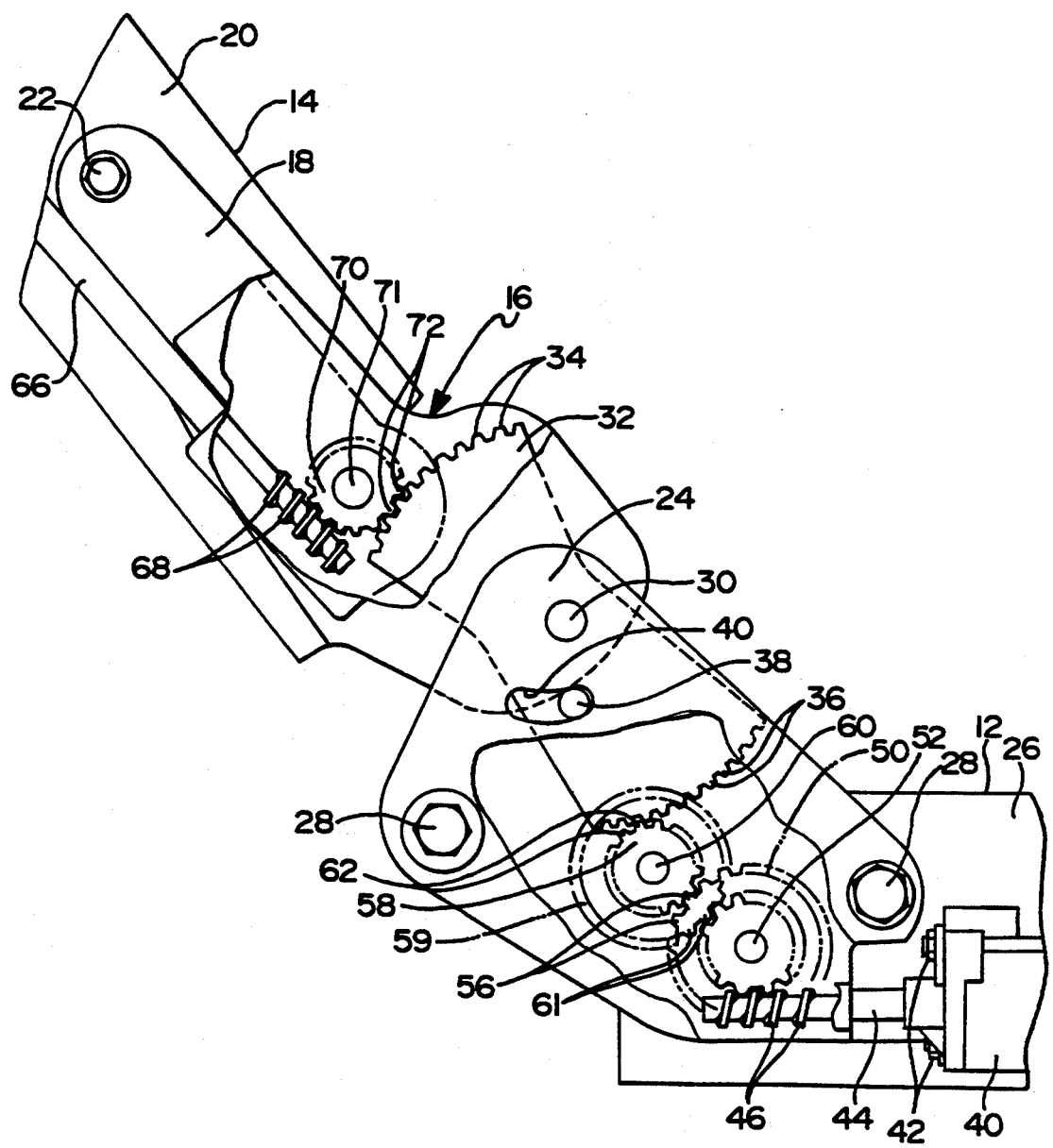
FIG. 5 is a view similar to FIG. 4 illustrating a rearward recline position of the powered vehicle seat of FIGS. 1 through 3.

Referring to FIG. 5, an occupant activates a switch (not shown) on the seat portion 12 to allow power from the source of power to the recline motor 40. Upon receiving power, the recline motor 40 rotates the cable 44 and teeth 46. Rotation of the teeth 46 rotates the recline gears 48 and 50 about the pin 52 and recline gears 58 and 59 about the pin 60. The teeth 62 of the recline gear 58 engage the second teeth 36 of the sector member 32 to rotate the sector member 32 about the pin 30. Since the dump gear 70 remains stationary relative to the sector member 32, rotation of the sector member 32 rotates or moves the back member 18 and back portion 14 rearward relative to the seat member 24 and seat portion 12 to the rearward recline position illustrated by the solid lines in FIG. 5. As the sector member 32 rotates, the pin 38 moves along the slot 40 until pin 38 engages the end of the slot 40 to limit the rearward movement of the back portion 14. The operation may be reversed by activating the switch on the seat portion 12 to move the back portion 14 to its original or neutral position illustrated by the phantom lines in FIG. 4.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vehicle seat for an occupant of a vehicle comprising:
   a generally horizontal seat portion mounted to vehicle structure;
   a generally upright back portion;
   connection means interconnecting said seat portion and said back portion to allow said back portion to rotate relative to said seat portion between a forward dump position and a rearward recline position; and
   powered means mounted on each of said back portion and said seat portion to operatively engage said connection means for independently driving said back portion between said forward dump position and said rearward recline position respectively in response to an occupant input.

2. A vehicle seat as set forth in claim 1 including activating means for activating said powered means in response to the occupant input.

3. A vehicle seat as set forth in claim 2 wherein said activating means comprises a switch mounted on said back portion to allow power from a power source to said powered means.

4. A vehicle seat as set forth in claim 1 wherein said connection means comprises a back member secured to said back portion, a seat member secured to said seat portion, and pivotal means interconnecting said back member and said seat member.

5. A vehicle seat as set forth in claim 4 including a sector member disposed about said pivotal means to engage said powered means.

6. A vehicle seat as set forth in claim 1 wherein said powered means comprises a motor, at least one gear engaging said connection means, and means interconnecting said motor and said at least one gear.

7. A vehicle seat as set forth in claim 8 wherein said motor is electric.

8. A vehicle seat as set forth in claim 6 wherein said interconnecting means comprises a Bowden cable operatively connected to said motor and having a plurality of first teeth at one end to engage said at least one gear.

9. A vehicle seat as set forth in claim 8 wherein said at least one gear is connected to one of said back portion and said seat portion and having a plurality of second teeth to engage said first teeth and said interconnecting means.

10. A vehicle seat for an occupant of a vehicle comprising:
a generally horizontal seat portion mounted to vehicle structure;
a generally upright back portion;
a back member secured to said back portion, a seat member secured to said seat portion, and pivotal means interconnecting said back member and said seat member to allow rotation between said back member and said seat member between a forward dump position and a rearward recline position;
a sector member disposed about said pivotal means;
said sector member being elongated with two ends and having a plurality of teeth on both said ends thereof; and
powered means mounted on each of said back portion and said seat portion for engaging said teeth of respective ends of said sector member for driving said back portion between said forward dump position and said rearward recline position respectively in response to an occupant input.

11. A vehicle seat for an occupant of a vehicle comprising:
a generally horizontal seat portion mounted to vehicle structure;
a generally upright back portion;
connection means interconnecting said seat portion and said back portion to allow said back portion to rotate relative to said seat portion between a forward dump position and a rearward recline position;
said connection means comprising a back member secured to said back portion, a seat member secured to said seat portion, and pivotal means interconnecting said back member and said seat member to allow rotation between said back member and said seat member;
a sector member disposed about said pivotal means; and
said sector member including a pin extending outwardly, said seat member including a slot extending therethrough, said pin extending through said slot to control movement of said sector member relative to said seat member powered means mounted on each of said seat portion and said back portion for engaging said sector member and for driving said back portion between said forward dump position and said rearward recline position respectively in response to an occupant input.

12. A vehicle seat for an occupant of a vehicle comprising:
a generally horizontal seat portion mounted to vehicle structure;
a generally upright back portion;
connection means interconnecting said seat portion and said back portion to allow said back portion to rotate relative to said seat portion between a neutral upright position and a forward dump position;
a sector member mounted on said connection means, said sector member being elongated with a first toothed end and a second toothed end, powered means mounted on said seat portion to engage said second toothed end of said sector member for driving said back portion between said neutral upright position and a rearward recline position in response to an occupant input, a motor mounted on said back portion, at least one gear mounted on said connection means and engaging said first toothed end of said sector member, and means interconnecting said motor and said at least one gear for driving said back portion between said neutral upright position and said forward dump position in response to an occupant input.

13. A vehicle seat as set forth in claim 12 including activating means connected to said motor for activating said motor in response to the occupant input.

14. A vehicle seat as set forth in claim 13 wherein said activating means comprises a switch mounted on said back portion to allow power from a source to said motor.

15. A vehicle seat as set forth in claim 12 wherein said connection means comprises a back member secured to said back portion, a seat member secured to said seat portion, and a pin interconnecting said back member and said seat member to allow rotation between said back member and said seat member.

16. A vehicle seat as set forth in claim 12 wherein said interconnecting means comprises a Bowden cable having a plurality of first teeth at one end to engage teeth of said at least one gear.

17. A vehicle seat as set forth in claim 16 wherein said at least one gear is connected to said back portion and moves relative to said sector member.

18. A vehicle seat as set forth in claim 17 wherein said motor is electric and connected to said cable.

19. A vehicle seat for an occupant of a vehicle comprising:
a generally horizontal seat portion mounted to vehicle structure;
a generally upright back portion;
a back member secured to said back portion, a seat member secured to said seat portion, and a pin interconnecting said back member and said seat member to allow rotation between said back member and said seat member;
a sector member disposed about said pin and being elongated with a first toothed end and a second toothed end;
a dump motor mounted to said back portion, at least one dump gear engaging said first toothed end of said sector member, and first means interconnecting said dump motor and said at least one dump gear;

a recline motor mounted to said seat portion, at least one recline gear engaging said second toothed end of said sector member, and second means interconnecting said recline motor and said at least one recline gear for driving said back portion between said neutral upright position and a rearward recline position; and a switch mounted on said either one of back portion and said seat portion to allow power from a power source to either one of said dump motor and said recline motor for driving said back portion between a rearward recline position and a forward dump position.

* * * * *